(12) United States Patent
Audic

(10) Patent No.: US 8,437,696 B2  
(45) Date of Patent: May 7, 2013

(54) LOW POWER NEAR-FIELD COMMUNICATION DEVICES

(75) Inventor: Jean-Philippe Audic, Aix-en-Provence (FR)

(73) Assignee: NXP B.V., Eindhoven (NL)

( * ) Notice: Subject to any disclaimer, the term of this patent is extended or adjusted under 35 U.S.C. 154(b) by 280 days.

(21) Appl. No.: 12/937,697

(22) PCT Filed: Apr. 14, 2009

(86) PCT No.: PCT/IB2009/051562  
§ 371 (c)(1),  
(2), (4) Date: Nov. 12, 2010

(87) PCT Pub. No.: WO2009/128032  
PCT Pub. Date: Oct. 22, 2009

(65) Prior Publication Data  
US 2011/0059694 A1    Mar. 10, 2011

(30) Foreign Application Priority Data  
Apr. 15, 2008  (EP) .................................... 08290368

(51) Int. Cl.  
*H04B 5/00*  (2006.01)

(52) U.S. Cl.  
USPC ........................................... 455/41.1; 455/77

(58) Field of Classification Search ................ 455/41.1, 455/41.2, 41.3, 77, 120, 121; 327/564, 565; 340/572.1, 572.2, 572.3, 572.4, 572.5, 572.6, 340/572.7  
See application file for complete search history.

(56) References Cited

U.S. PATENT DOCUMENTS

| 2003/0104848 | A1  | 6/2003  | Brideglall |
| 2005/0156752 | A1  | 7/2005  | Finkenzeller et al. |
| 2006/0244630 | A1  | 11/2006 | Finkenzeller |
| 2007/0026826 | A1* | 2/2007  | Wilson .......................... 455/130 |
| 2007/0222605 | A1* | 9/2007  | Andresky ................... 340/572.7 |
| 2008/0194200 | A1* | 8/2008  | Keen et al. ................... 455/41.1 |

FOREIGN PATENT DOCUMENTS

| EP | 1840790 A2 * | 10/2007 |
| WO | 03/052672 A1 | 6/2003 |
| WO | 2006076669 A1 | 7/2006 |

OTHER PUBLICATIONS

International Search Report for Application PCT/IB2009/051562 (Apr. 14, 2009).

* cited by examiner

*Primary Examiner* — Ping Hsieh

(57) ABSTRACT

Power consumption of near-field communication devices is regulated by waking the device for communications when a potential external near-field device is detected, and by adjusting the resonant antenna circuit to account for the detected change in antenna environment. Such near-field communication devices, which may be used to detect and read external RFID tags, include a resonant loop antenna circuit having an antenna and a variable component, the antenna circuit being tunable by adjusting the variable component. The antenna has a target range of operation for near-field communication, and an inductance that is susceptible to interference that can alter the target range. The resonant loop antenna circuit is connected to an integrated circuit that includes a controller for controlling near-field communications via the resonant loop antenna circuit, an inductance detection circuit to detect changes in the antenna inductance, a wake-on circuit responsive to a sufficient change in antenna inductance to transition the controller from a low power sleep mode to a communications mode, and an antenna tuning circuit to adjust the variable component of the resonant loop antenna circuit to compensate for changes in antenna inductance and to maintain the target range of operation.

17 Claims, 3 Drawing Sheets

LOW POWER NEAR-FIELD COMMUNICATION DEVICES

Figure 1:
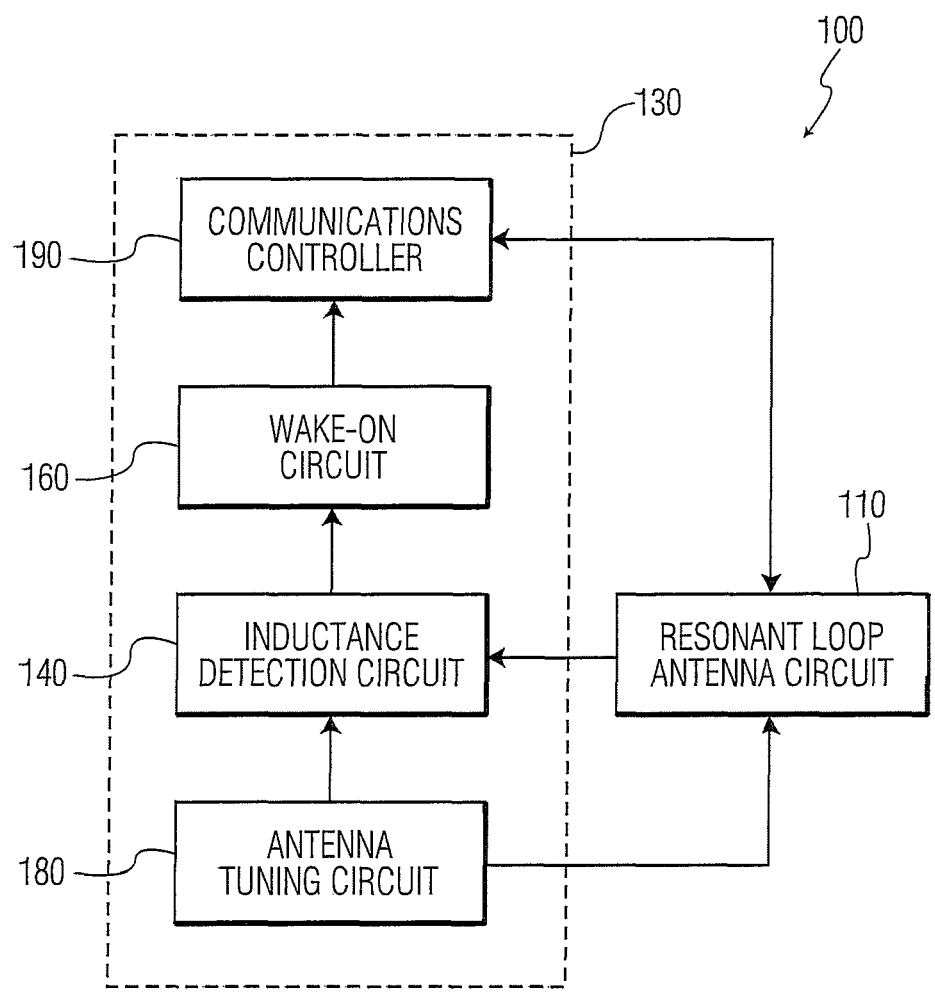

The present invention relates generally to near-field communication devices and to circuitry for reducing the power consumption of near-field communication detection devices.

Near-field communication (NFC) is a short-range wireless communication technology for exchanging data between devices over distances of centimeters to tens of centimeters. One example application for NFC is radio-frequency identification (RFID) where a reader device can detect and retrieve data from a tag equipped with an antenna. NFC devices can typically communicate with any device configured for accepted protocols, such as a smartcard, readers, or tags, and is therefore compatible with existing contactless infrastructure.

NFC devices communicate via magnetic field induction where two loop antennas are located within each other's near field, effectively forming an air-core transformer. There are generally two modes of NFC: a passive communication mode where the initiating device provides a carrier field and the target device answers by modulating the existing field; and an active communication mode where both the initiating and target devices communicate by alternately generating their own field. To operate in active mode, both devices typically need to have a power supply, whereas in passive mode the target device may draw its operating power from the electromagnetic field provided by the initiating device.

NFC-enabled devices include those devices operable in a card mode that responds to commands sent by an external reader, in a reader mode that sends commands to and receives responses from an external tag or card, and in a peer-to-peer mode that exchanges data with other NFC devices configured for peer-to-peer mode communications.

Various aspects of the present invention are directed to near-field communication devices, for example to detect and read external RFID tags. Such devices include a resonant loop antenna circuit having an antenna and a variable component, the antenna circuit being tunable by adjusting the variable component. The antenna has a target range of operation for near-field communication, and an inductance that is susceptible to interference that can alter the target range. The resonant loop antenna circuit is connected to an integrated circuit that includes a controller for controlling transmitting and receiving near-field communications signals via the resonant loop antenna circuit, an inductance detection circuit to detect changes in the antenna inductance indicative of incidents of interference due to an external object located proximate to the device, a wake-on circuit responsive to a sufficient change in antenna inductance being detected by the inductance detection circuit to thereby transition the controller from a low power sleep mode to a communications mode, and an antenna tuning circuit to adjust the variable component of the resonant loop antenna circuit to compensate for changes in antenna inductance and to maintain the target range of operation.

Various aspects of the present invention are further directed to methods for use in a near-field communication device such as described above. Such methods include detecting changes in the antenna inductance, transitioning the integrated circuit controller from a low power sleep mode to a communications mode in response to detecting a sufficient change in antenna inductance, and adjusting the variable component of the resonant loop antenna circuit to compensate for the detected changes in antenna inductance to maintain the target range of operation.

The above summary is not intended to describe each embodiment or every implementation of the present disclosure. The Figures and detailed description that follow more particularly exemplify various embodiments.

Figure 2:
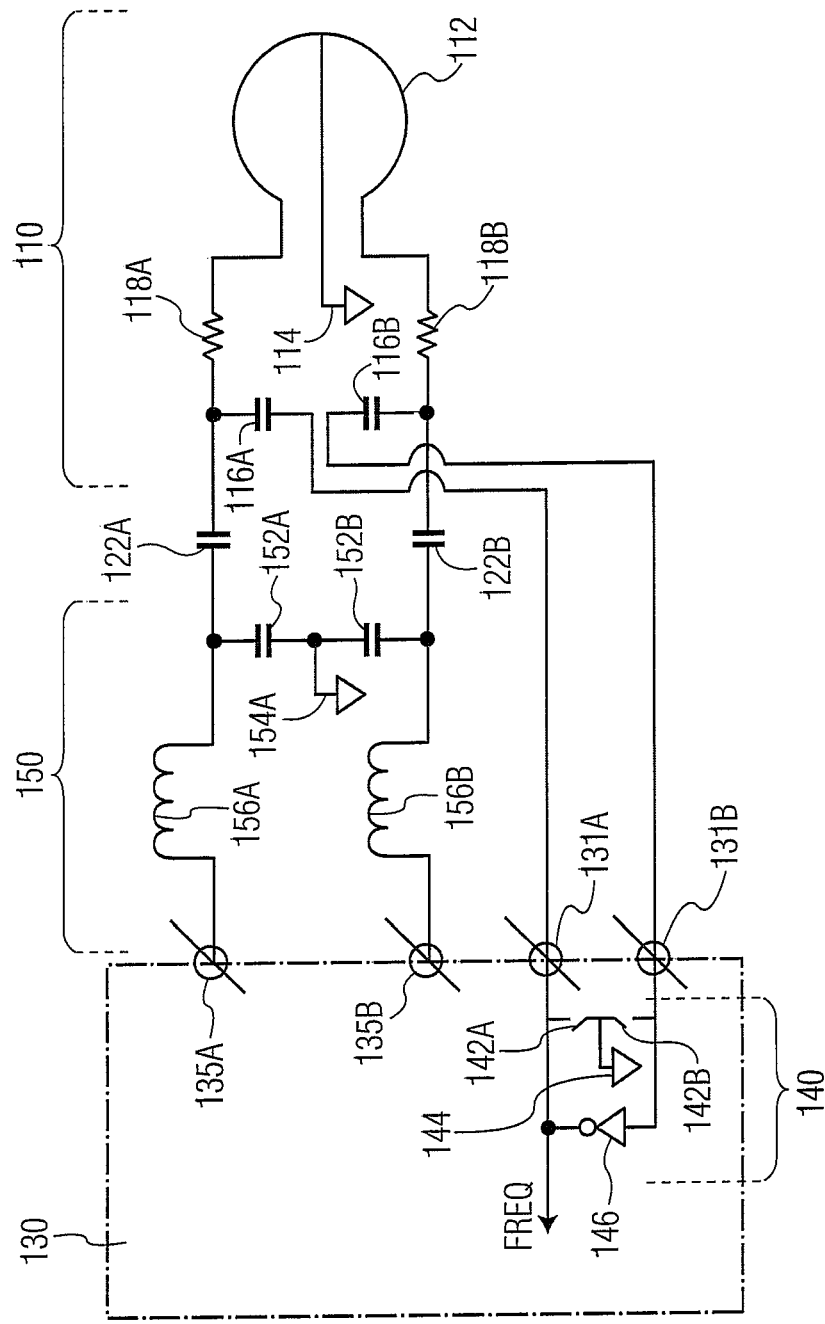
Figure 3:
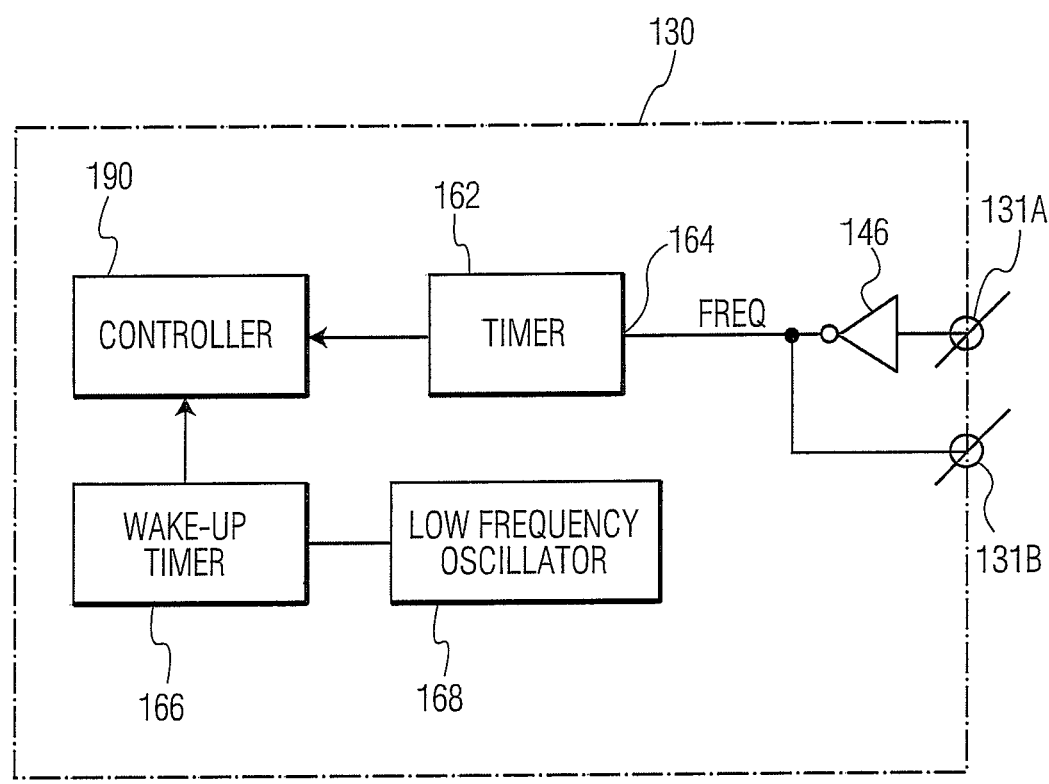

The invention may be more completely understood in consideration of the following detailed description of various embodiments of the invention in connection with the accompanying drawings, in which:

FIG. 1 schematically illustrates an example near-field communication device in accordance with certain embodiments of the present invention;

FIG. 2 schematically illustrates resonant antenna circuitry and inductance detection circuitry useful in near-field communication devices in accordance with certain embodiments of the present invention; and FIG. 3 schematically illustrates circuitry for periodically waking a controller for inductance detection in accordance with certain embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined by the appended claims.

Embodiments of the present invention relate to NFC communication devices for detecting and reading external NFC devices such as RFID tags. In exemplary embodiments, such NFC communication devices include an inductance detection circuit to detect changes in antenna inductance indicative of incidents of interference due to an external object located proximate to the device, a wake-on circuit responsive to a sufficient change in antenna inductance to thereby transition a controller of the device from a low power sleep mode to a communications mode, and an antenna tuning circuit to adjust a variable component of the antenna circuit to compensate for changes in antenna inductance detected by the inductance detection circuit to maintain a target range of operation, for example as a baseline for subsequent antenna inductance measurements.

NFC communications devices in accordance with embodiments of the present invention communicate using a resonant loop antenna circuit susceptible to interference that can alter the antenna inductance. Detection of inductance changes due to such interference can be used by wake-on circuitry to determine whether the controller should be transitioned out of a low power sleep mode to attempt communications. In this way, power for communications may be conserved and spent when it is determined that a potential external NFC device is present. In accordance with certain embodiments, transitioning the controller out of the low power sleep mode is accompanied by attempts to communicate with the potential external device. If repeated attempts to communicate are met with no response, then the controller is transitioned back to the low power sleep mode.

Furthermore, in accordance with certain embodiments, an antenna tuning circuit is used to adjust a variable component of the antenna circuit to compensate for inductance changes due to interference by the external object. Subsequent detection of antenna inductance changes may then be referenced to the last detected antenna environment. For example, consider the case of detecting an inductance change sufficient to wake-up the controller and where the controller unsuccessfully attempts to communicate with the object de-tuning the antenna. Upon tuning the antenna, the next inductance change measurement will wake-up the controller again only if a sufficient inductance change is detected as referenced to the adjusted antenna. Compensating for antenna interference in this way can be used to prevent unnecessarily waking the controller in response to repeatedly detecting the presence of the same disturbance over short time frames such as from one inductance measurement to the next.

Various embodiments of the present invention may be particularly suitable for use in battery-powered near-field communications (NFC) applications, for example in devices such as mobile phones, PDAs, laptop computers, and so forth that are equipped, or that may be equipped, with NFC capabilities. In accordance with certain embodiments, the complexity of user interactions with NFC devices may be simplified by allowing the user to initiate communications simply by bringing an NFC reader device sufficiently close to another NFC device (e.g., a card, reader or peer). Embodiments of the present invention provide for detecting a potential external NFC device without generating an RF magnetic field, thereby reducing the power requirements and enabling a true "magic touch" implementation on battery-powered products.

Automatic device detection triggers communication attempts by detecting the interference caused by proximity to another device without requiring further user action. If the communications attempts are unsuccessful, the reader device can be placed back in low power sleep mode to conserve the battery. In battery-powered NFC devices, actively looking for an external device, such as a card or tag, with which to communicate can be a significant power drain on the battery. To detect an external device, an RF magnetic field is generated and commands are sent in the hopes of finding a device. Generating the RF magnetic field involves using several hundreds of milliwatts of power, and involves the field being in an ON state for a relatively long time (e.g., tens of milliseconds). Certain embodiments of the present invention provide circuitry that provides detection of antenna inductance variations in a manner that uses a relatively limited amount of power (e.g., on the order of a few milliwatts) for a relatively limited amount of time (e.g., on the order of a few ms).

FIG. 1 functionally illustrates a near-field communication device 100 that includes a resonant loop antenna circuit 110 connected to an integrated circuit (IC) 130. The IC includes a communications controller 190, a wake-on circuit 160 controlling the power mode of the controller and responsive to an inductance detection circuit 140, and an antenna tuning circuit 180 that applies an adjustment factor to the antenna circuit based on measurements by the inductance detection circuit 140. The inductance detection circuit 140 may be operated on a duty cycle so that it periodically probes the antenna circuit 110 for an inductance measurement. If the inductance of the antenna circuit changes more than a threshold amount from a target operating range (which may be adjusted by the tuning circuit 180), the wake-on 160 operates to transition the controller 190 from a low power sleep mode to a communications mode. In communications mode, the controller 190 processes and transmits signals via the resonant loop antenna circuit 110, and is capable of receiving signals back via the resonant loop antenna circuit 110 for processing. The inductance measurements performed by the inductance detection circuit 140 may be used by the antenna tuning circuit 180 to adjust a variable component of the resonant loop antenna circuit 110 to maintain the antenna circuit within the target operating range.

It is recognized that the antenna inductance can be modified by objects other than readable NFC devices such as tags and cards. For example, various metal objects such as car keys that come into close proximity with the NFC reader device can cause an inductance change sufficient to wake-up the IC for communications attempts. In accordance with certain embodiments, when the IC is transitioned from low power sleep mode to communications mode due to a detected change in antenna inductance, near-field communications are attempted with the external object a set number of times (e.g., 5 attempts). Successful communications attempts may be followed by normal communications. If no answer is received back after the set number of attempts, the IC may be transitioned back into low power sleep mode.

Under conditions where the non-NFC external interfering object persists in the vicinity of the NFC reader device, there is a risk that every time the antenna inductance is checked that the IC will be transitioned out of sleep mode to attempt communications. As such, in accordance with certain embodiments, the antenna tuning circuit may be used to compensate for antenna de-tuning due to the presence of external objects. This has the effect of setting a new baseline for the next antenna inductance change detection to help avoid unnecessary waking of the IC due to the interference from the same non-NFC external object.

In certain embodiments, the antenna tuning circuit is configured to use the antenna-based oscillator frequency measured by the inductance detection circuit to calculate the inductance, and then adjust the value of an adjustable component of the antenna circuit to compensate. For example, a look-up table may be used by the tuning circuit in such a way that the calculated inductance value is matched to a value in the look-up table for adjustment of the adjustable component of the antenna circuit. In exemplary embodiments, the adjustable component is the capacitance of the resonant antenna circuit. For example, the antenna circuit capacitor may be a voltage-controlled variable capacitor, and the value applied by the tuning circuit is the appropriate voltage. The objective is to adjust the antenna circuit so that the frequency detected by the inductance detection circuit during the next measurement is referenced to the last measurement, thereby waking up the IC only when the environment has changed since the last detected change.

FIG. 2 schematically illustrates exemplary circuitry suitable for use with certain embodiments of the present invention. Resonant loop antenna circuit 110 includes a loop antenna 112 connected to a ground 114, the loop antenna having a characteristic inductance which is connected in parallel with a capacitance to create the resonant circuitry. As shown in FIG. 2, the capacitance is formed by series capacitors 116A and 116B, which are connected to ground 144 when switches 142A and 142B are closed, as described in more detail below. Resistors 118A and 118B are added to provide control over the antenna quality factor.

FIG. 2 further indicates components added between the antenna circuit 110 and the IC 130 to reduce electromagnetic interference (EMI), such as EMI filter 150. EMI filter includes inductors 156A and 156B, capacitors 152A and 152B, and ground 154 connected as shown. Capacitors 122A and 122B are added between the EMI filter 150 and the antenna circuit 110 to match the antenna impedance to the EMI filter. The EMI filter 150 is connected to the IC 130 via input/output pins (I/Os) 135A and 135B.

FIG. 2 further indicates an inductance detection circuit 140 housed in the IC 130 and connected to the resonant antenna circuit 110 via I/Os 131A and 131B, which are in turn routed to internal switches 142A and 142B of the inductance detection circuit 140. The switches 142A and 142B are controlled to switch between a communications mode (switches ON) and an inductance measurement mode (switches OFF). In the communications mode, the switches 142A and 142B connect capacitors 116A and 116B to ground 144. In the inductance measurement mode, the switches 142A and 142B connect the capacitors 116A and 116B to the oscillator 146, which provides an output frequency Freq that can be correlated to the antenna inductance as described in the following discussion.

As will be appreciated from the circuitry shown in FIG. 2, in certain embodiments of the present invention, the inductance detection circuitry is configured to be implemented using low voltage CMOS technology. Referring to FIG. 2, the capacitance of the antenna circuit 110 is split into two capacitors 116A and 116B.

The ground connection for these capacitors is through the two switches 142A and 142B, which may be simple NMOS components, and thus low voltage. In communications mode, the switches 142A and 142B are ON, and they see 0 V on both their drain and source. In inductance monitoring mode, the switches 142A and 142B see 0 V on their source and a low voltage on their drain (e.g., about 1.8 V for 1.8 V oscillator control circuitry).

Using a microcontroller embedded in the IC 130, the frequency Freq generated by oscillator 146 can be measured by any suitable technique. For example, the output of the oscillator 146 may be provided to a timer 160 that has a dedicated capture input. One or more thresholds may be set, for example using software or firmware control, the threshold(s) being used to decide whether the measured frequency, and thus the antenna inductance, has changed enough to wake-up the whole IC for normal communications.

In detecting and measuring changes to the antenna inductance, an oscillator may be used to detect changes in resonant frequency (Freq) of the antenna circuit, which can be correlated to the capacitance ($C_P$) and inductance ($L_{ANT}$) of the antenna circuit through the relationship:

$$F=1/[Sqrt(C_P \times L_{ANT})].$$

In the example circuitry shown in FIG. 2, switches 142A and 142B control the connecting of the two antenna circuit capacitors 116A and 116B either to ground 144 (in standard operating mode) or to an oscillator electronic driver 146 (in inductance measure mode). This can be accomplished by connecting the second pin of both capacitors 116A and 116B to the IC pins 131A and 131B rather than directly to ground. In standard mode, an internal switch is used to connect the antenna circuit capacitors to ground. This switch is considered OFF when the inductance measure mode is activated. The inductance measure mode can be performed using a relatively low amount of current. For example, a typical oscillator drains about 1 mA, and a typical microcontroller-based measurement system drains about 1 mA. The measurement can be done in a few milliseconds (e.g., about 5 msec or less).

Detecting a potential external NFC device involves monitoring for changes in the antenna circuit that are indicative of interference. While monitoring for antenna de-tuning has been described in terms of measuring frequency changes, de-tuning of the antenna may be detected by other means, including monitoring for changes in the voltage of the antenna circuit. However, many devices have antenna circuits that operate based on tuning principles that attempt to keep the antenna impendence as constant as possible, thereby producing a more constant voltage and rendering voltage monitoring less effective. In such cases, antenna de-tuning may be detected based on the voltage/current phase shift.

FIG. 3 illustrates an exemplary inductance detection wake-up functionality within the IC. The Freq signal provided by oscillator 146 provides an input signal 164 to timer 162 for determining the frequency. An integrated low power, low frequency oscillator 168 is used to regulate a wake-up timer 166 that transitions the controller 190 from a low power sleep mode to an inductance measurement mode. In inductance measurement mode, any changes in inductance are determined from the measured frequency, and if the change in inductance is above a threshold, the IC is transitioned to a communications mode for attempting communications with the perceived external device.

As discussed, in accordance with certain embodiments, the average current drained by NFC reader devices may be significantly reduced by placing the IC 130 in a low power sleep mode and activating the inductance measurement periodically. For example, the inductance detection circuitry may be operated on a duty cycle so that it checks for changes in antenna inductance every fraction of a second (e.g., every 0.5 sec). An integrated low power/low speed oscillator may be used to wake-up the microcontroller from the low power sleep mode to normal communications mode. In this scenario, if the inductance detection circuit is operated for 5 msec every 0.5 sec, and the total current drained during inductance measurement is about 2 mA, then the total current will be about 20 µA (i.e., 0.002 A×0.005 sec/0.5 sec=20 µA).

In addition to the above, the various processing approaches described herein can be implemented using a variety of devices and methods including general purpose processors implementing specialized software, digital signal processors, programmable logic arrays, discrete logic components and fully-programmable and semi-programmable circuits such as PLAs (programmable logic arrays). For example, the above algorithms are executed on a microcomputer (a.k.a. microprocessor) in connection with certain embodiments, and as may be implemented as part of one or more of the devices shown in the Figures.

As will be appreciated, certain embodiments of the present invention may be integrated into existing NFC reader devices without additional external components being required. However, the present invention also includes implementations where various of the circuit components are provided external to the IC. It will be recognized that the circuits described herein may be manufactured using standard processes and techniques. While the present invention has been described above and in the claims that follow, those skilled in the art will recognize that many changes may be made thereto without departing from the spirit and scope of the present invention.

What is claimed is:

1. A near-field communication device for detecting and reading external RFID tags, the device comprising:
   a resonant loop antenna circuit including an antenna and a variable component, the antenna having a target range of operation for near-field communication where the antenna inductance is susceptible to interference that can alter the target range, the antenna circuit being tunable by adjusting the variable component; and
   an integrated circuit connected to the resonant loop antenna circuit, the integrated circuit comprising:
      a controller for controlling transmitting and receiving near-field communications signals via the resonant loop antenna circuit,
      an inductance detection circuit to detect changes in the antenna inductance indicative of incidents of interference due to an external object located proximate to the device,
      an antenna tuning circuit to adjust the variable component of the resonant loop antenna circuit to compensate for changes in antenna inductance detected by the inductance detection circuit to maintain the target range of operation, and
      a wake-on circuit responsive to a sufficient change in antenna inductance being detected by the inductance detection circuit to transition the controller from a low power sleep mode to a communications mode where the wake-on circuit is only again responsive to the sufficient change in antenna inductance as referenced to the adjusted resonant loop antenna circuit.

2. The near-field communication device of claim 1, wherein the controller is configured to attempt near-field communications with the object responsive to the wake-on circuit transitioning the controller to the communications mode.

3. The near-field communication device of claim 2, wherein the wake-on circuit is configured to transition the controller from the communications mode to the low power sleep mode responsive to failure of the attempted near-field communications with the object.

4. The near-field communication device of claim 3, wherein failure of the attempted near-field communications with the object is determined by a set number of attempts to read the object without receiving an answer.

5. The near-field communication device of claim 1, wherein the detection circuit includes an oscillator switchably connectable to the resonant loop antenna circuit, the oscillator producing a frequency output usable to determine the antenna inductance.

6. The near-field communication device of claim 1, wherein changes in the antenna inductance are detected based on a voltage/current phase shift.

7. The near-field communication device of claim 1, wherein the resonant loop antenna circuit includes a resistor to control an antenna quality factor.

8. The near-field communication device of claim 1, wherein the variable component of the resonant loop antenna circuit includes a voltage-controlled variable capacitor.

9. The near-field communication device of claim 1, wherein the antenna tuning circuit adjusts the variable component of the resonant loop antenna circuit in accordance with adjustment values stored in a look-up table.

10. A method for use in a near-field communication device for detecting and reading external RFID tags using a resonant loop antenna circuit that includes an antenna and a variable component, the antenna having a target range of operation for near-field communication where the antenna inductance is susceptible to interference that can alter the target range, the antenna circuit being tunable by adjusting the variable component, and an integrated circuit connected to the resonant loop antenna circuit, the integrated circuit including a controller for controlling transmitting and receiving near-field communications signals via the resonant loop antenna circuit, the method comprising:

detecting changes in the antenna inductance;

responsive to detecting a sufficient change in antenna inductance, transitioning the integrated circuit controller from a low power sleep mode to a communications mode;

adjusting the variable component of the resonant loop antenna circuit to compensate for the detected changes in antenna inductance to maintain the target range of operation;

and upon adjusting the variable component of the resonant loop antenna circuit only transitioning the integrated circuit controller from a low power sleep mode to a communications mode again if the sufficient change in antenna inductance is detected as referenced to the adjusted antenna resonant loop antenna circuit.

11. The method of claim 10, further comprising attempting near-field communications in response to transitioning the controller to the communications mode.

12. The method of claim 11, further comprising transitioning the controller from the communications mode to the low power sleep mode responsive to failure of the attempted near-field communications.

13. The method of claim 12, wherein failure of the attempted near-field communications is determined by a set number of attempts without receiving an answer.

14. The method of claim 10, wherein detecting changes in the antenna inductance comprises controlling a switch to connect the resonant loop antenna circuit to an oscillator, the oscillator producing a frequency output usable to determine the antenna inductance.

15. The method of claim 14, wherein the switch is controlled in accordance with a duty cycle.

16. The method of claim 10, wherein adjusting the variable component of the resonant loop antenna circuit includes adjusting a voltage-controlled variable capacitor of the resonant loop antenna circuit.

17. The method of claim 10, wherein adjusting the variable component of the resonant loop antenna circuit includes using a look-up table to compare the detected change in inductance with adjustment values stored in the look-up table.

* * * * *